(12) United States Patent
Ramarge et al.

(10) Patent No.: US 11,757,279 B2
(45) Date of Patent: Sep. 12, 2023

(54) SURGE ARRESTER FOR FIRE MITIGATION

(71) Applicant: Eaton Intelligent Power Limited, Dublin (IE)

(72) Inventors: Michael Mahlon Ramarge, Olean, NY (US); Timothy Stephen Smith, Fuquay Varina, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/400,206

(22) Filed: Aug. 12, 2021

(65) Prior Publication Data

US 2022/0069568 A1 Mar. 3, 2022

Related U.S. Application Data

(60) Provisional application No. 63/069,989, filed on Aug. 25, 2020.

(51) Int. Cl.
*H02H 9/02* (2006.01)
*H01C 7/12* (2006.01)
*H01C 1/028* (2006.01)

(52) U.S. Cl.
CPC ............ *H02H 9/02* (2013.01); *H01C 7/12* (2013.01); *H01C 7/123* (2013.01); *H01C 1/028* (2013.01)

(58) Field of Classification Search
CPC .. H02H 3/20; H02H 9/04; H02H 9/06; H02H 7/24; H01T 1/14; H01C 7/12; H01C 1/032
USPC ................................................ 361/117–120
See application file for complete search history.

(56) References Cited

U.S. PATENT DOCUMENTS

| 2,135,085 | A | | 11/1938 | Ludwig | |
|---|---|---|---|---|---|
| 4,930,039 | A | * | 5/1990 | Woodworth | H01C 7/12 361/127 |
| 5,113,306 | A | * | 5/1992 | Veverka | H01C 7/12 361/127 |

(Continued)

FOREIGN PATENT DOCUMENTS

| DE | 1954080 U | 1/1967 |
|---|---|---|
| JP | 2001023806 A | 1/2001 |
| WO | 9907053 A1 | 2/1999 |

OTHER PUBLICATIONS

Johannes Rucha, European International Searching Authority, International Search Report and Written Opinion, counterpart PCT Application No. PCT/EP2021/025311 dated Nov. 23, 2021, 16 pages total.

*Primary Examiner* — Danny Nguyen
(74) *Attorney, Agent, or Firm* — DiBerardino McGovern IP Group LLC

(57) ABSTRACT

A module for a fire-mitigating surge arrester includes: an inner arrester module including an electrically conductive assembly; a cartridge including a first end, a second end, a sidewall that extends between the first end and the second end, and an exhaust region in the sidewall, the sidewall surrounding the inner arrester module; a first electrical component in contact with a first end of the electrically conductive assembly and the first end of the cartridge; a second electrical component in contact with a second end of the electrically conductive assembly and the second end of the cartridge; and a reinforcement structure on the sidewall, the first electrical component, and the second electrical component.

26 Claims, 15 Drawing Sheets

(56) References Cited

U.S. PATENT DOCUMENTS

| | | | | |
|---|---|---|---|---|
| 5,296,998 A | * | 3/1994 | Jergenson | H01C 7/12 |
| | | | | 361/127 |
| 5,652,690 A | * | 7/1997 | Mansfield | H01C 7/12 |
| | | | | 361/127 |
| 5,684,665 A | * | 11/1997 | Rudy | H01C 7/126 |
| | | | | 361/127 |
| 8,593,775 B2 | * | 11/2013 | Gebhardt | H01C 7/12 |
| | | | | 361/120 |
| 10,109,399 B2 | | 10/2018 | Boese et al. | |
| 10,446,296 B2 | | 10/2019 | Roggow | |
| 2006/0227484 A1 | * | 10/2006 | Siljeholm | H01C 7/12 |
| | | | | 361/118 |

* cited by examiner

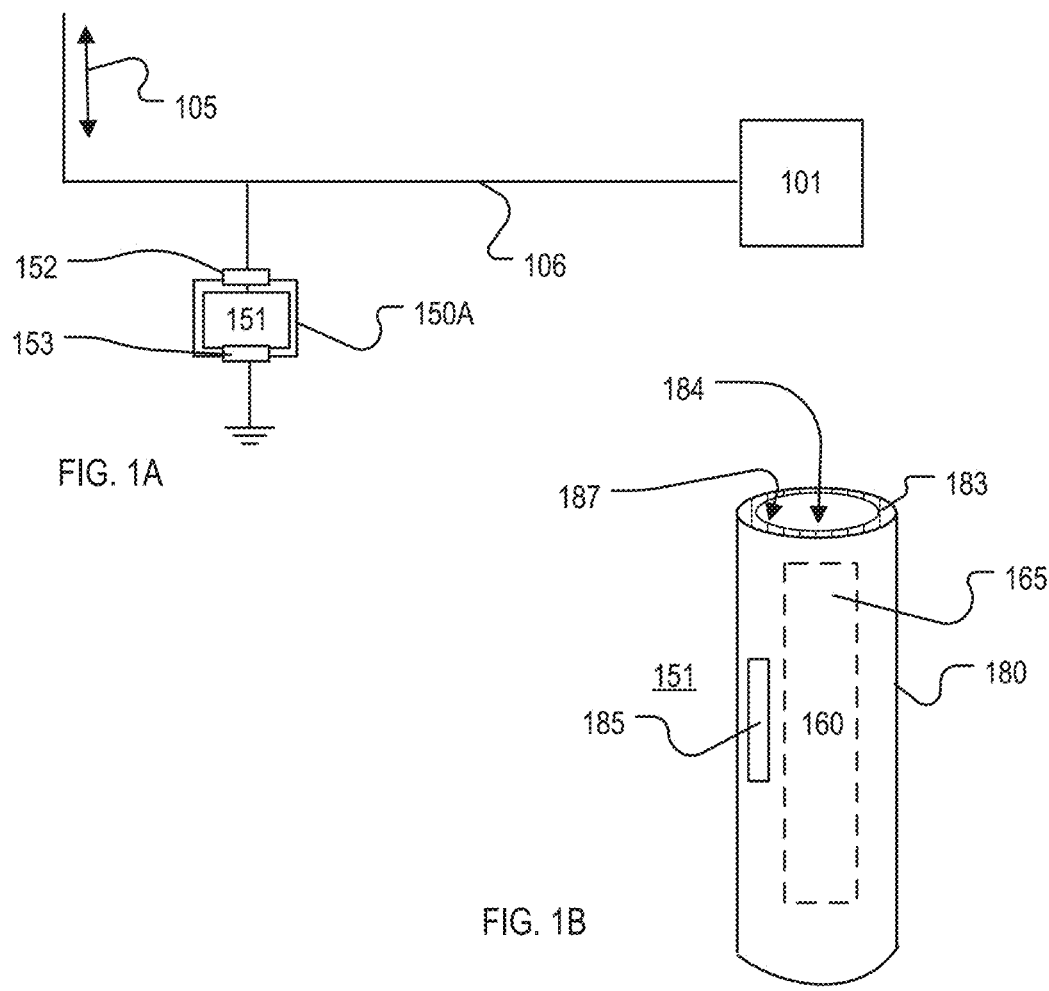

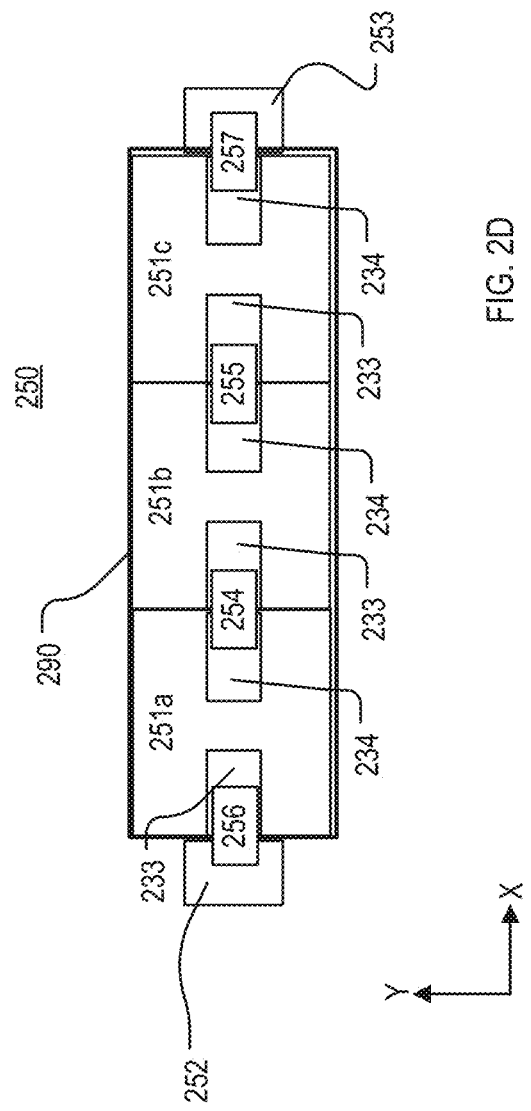

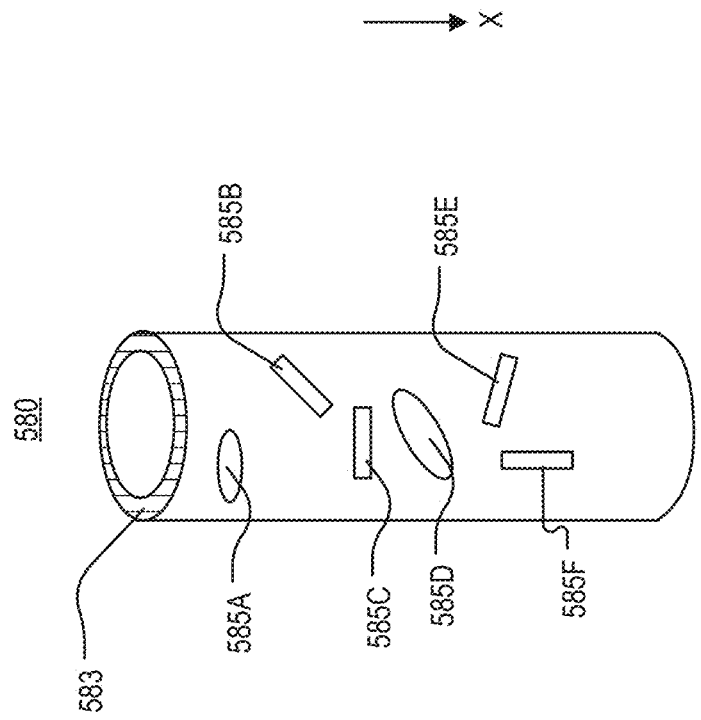
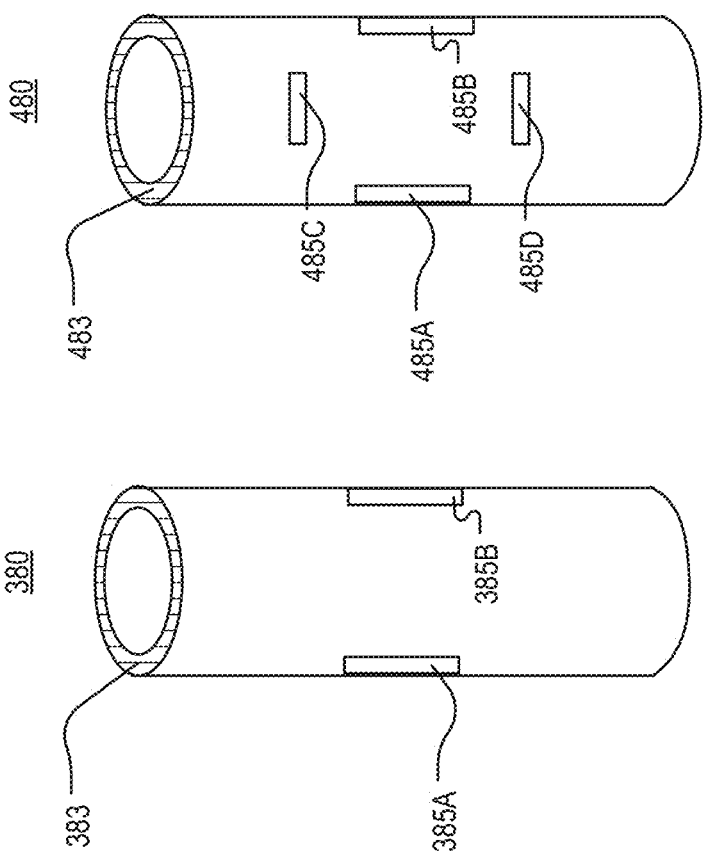

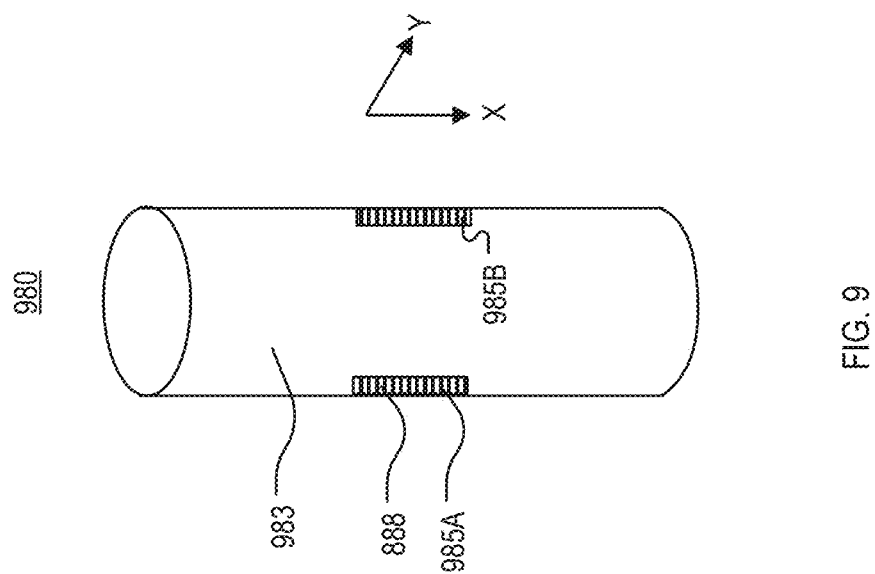

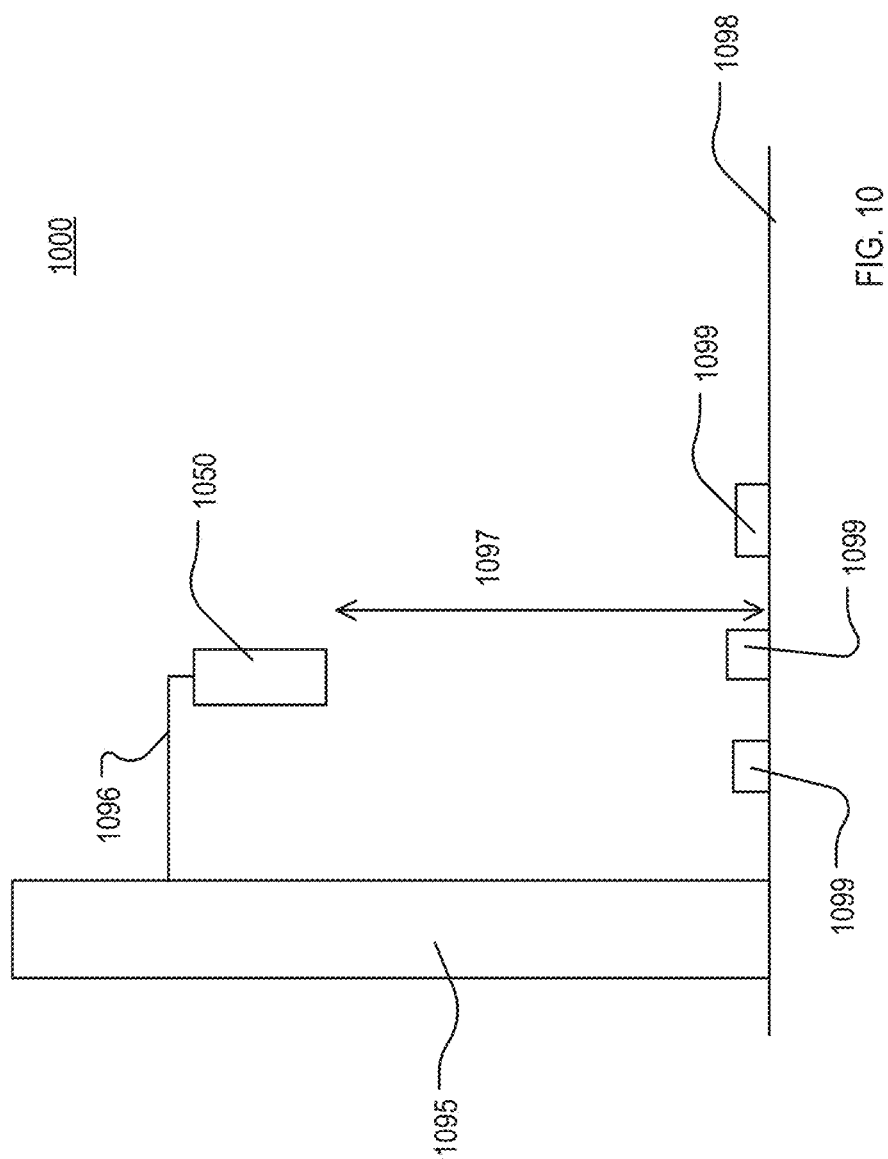

SURGE ARRESTER FOR FIRE MITIGATION

CROSS-REFERENCE TO RELATED APPLICATION

This application claims the benefit of U.S. Provisional Application No. 63/069,989, filed on Aug. 25, 2020 and titled SURGE ARRESTER FOR FIRE MITIGATION, which is incorporated herein by reference in its entirety.

TECHNICAL FIELD

This disclosure relates to a surge arrester for fire mitigation.

BACKGROUND

A surge arrester is used to protect electrical equipment. For example, a surge arrester clamps voltage surges that are capable of damaging the electrical equipment before the voltage surge reaches the electrical equipment.

SUMMARY

In one general aspect, a module for a surge arrester includes: an inner arrester module including an electrically conductive assembly; a cartridge including a first end, a second end, a sidewall that extends between the first end and the second end, and an exhaust region in the sidewall, the sidewall surrounding the inner arrester module; a first electrical component in contact with a first end of the electrically conductive assembly and the first end of the cartridge; a second electrical component in contact with a second end of the electrically conductive assembly and the second end of the cartridge; and a reinforcement structure on the sidewall, the first electrical component, and the second electrical component.

Implementations may include one or more of the following features.

A gap may be between an interior surface of the sidewall and the inner arrester module. The exhaust region may be an opening that passes through the sidewall. The exhaust region may be a plurality of openings that each pass through the sidewall. The exhaust region may include two openings that pass through the sidewall, and the two openings may be on opposite sides of the sidewall. In some implementations, the module also includes a fire retardant material in the gap. The fire retardant material may be in the gap and in at least one opening that passes through the sidewall.

The electrically conductive assembly may include a first electrode and a second electrode that are separated from each other by an open region.

In some implementations, the reinforcement structure that is on the sidewall, the first electrical component, and the second electrical component is a second reinforcement structure; and the inner arrester module also includes a first reinforcement structure on the electrically conductive assembly. One or more of the first reinforcement structure and the second reinforcement structure may include fiberglass and resin. One or more of the first reinforcement structure and the second reinforcement structure may include a pre-impregnated fiber matrix.

The first electrical component may include a first connection point configured to electrically connect the electrically conductive assembly to a first device, and the second electrical component may include a second connection point configured to electrically connect the electrically conductive assembly to a second device. One or more of the first device and the second device may be another module. The first connection point may be a first bolt, and the second connection point may be a second bolt.

An exterior housing may surround the reinforcement structure. An inner surface of the exterior housing may be in contact with the reinforcement structure.

In another aspect, a surge arrester includes: an exterior housing; and at least one arrester module in the exterior housing. Each arrester module includes: a cartridge including a first end, a second end, a sidewall that extends between the first end and the second end, and one or more exhaust regions in the side wall; and an inner arrester module in the cartridge, the inner arrester module including: an electrically conductive assembly; and a first reinforcement structure on the inner arrester module.

Implementations may include one or more of the following features.

Each arrester module also may include a second reinforcement structure on an exterior of the sidewall. The exterior housing may include a plurality of segments, and each module is in one of the segments. An exhaust region in one of the plurality of modules may be oriented in a different direction than an exhaust region in another one of the plurality of modules.

In some implementations, during an over-voltage condition, each of the electrically conductive assemblies conducts fault current, and a flammable material within a pre-determined distance of the surge arrester is not substantially damaged or does not ignite. The pre-determined distance may be 8 to 10 feet, and the fault current may be between 65 A and 12 kA. The flammable material may be directly below the surge arrester.

The inner arrester module may be separated from an interior surface of the sidewall such that there is an open region between the interior surface of the sidewall and the inner arrester module.

In another aspect, an assembly for a fire-mitigating surge arrester includes: an electrically conductive assembly; a first reinforcement structure on the electrically conductive assembly; and a cartridge including a first end, a second end, a sidewall that extends between the first end and the second end, and an exhaust region in the sidewall. The sidewall surrounds the electrically conductive assembly and the first reinforcement structure, and an open region is between an interior surface of the sidewall and the first reinforcement structure.

In some implementations, a fire retardant material is in the open region.

Implementations of any of the techniques described herein may include a system, module for a surge arrester, a surge arrester, an assembly, and/or a method. The details of one or more implementations are set forth in the accompanying drawings and the description below. Other features will be apparent from the description and drawings, and from the claims.

DRAWING DESCRIPTION

FIG. 1A is a block diagram of an example of a high-power electrical distribution system.

FIG. 1B is a perspective view of an example of an arrester module.

FIG. 2D is a side cross-sectional view of an example of a fire-mitigating surge arrester.

FIGS. 3-5 are perspective views of other examples of cartridges for a fire-mitigating surge arrester.

FIG. 9 is a perspective view of an example of a cartridge with a fire retardant material.

FIG. 10 is a block diagram of an example of a test scenario.

DETAILED DESCRIPTION

Figure 1C:
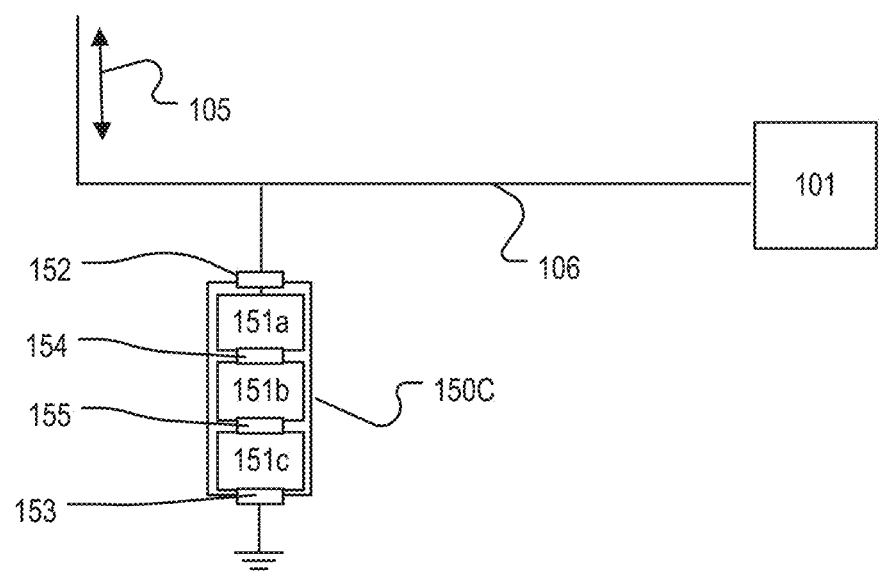
FIG. 1C is a block diagram of another example of a high-power electrical distribution system.

FIG. 1A is a block diagram of high-power electrical distribution system 100. The electrical power distribution system 100 may be, for example, an electrical grid, an electrical system, or a multi-phase electrical network that provides electricity to commercial, industrial, and/or residential customers. The electrical power distribution system 100 may have an operating voltage of, for example, at least 1 kilovolt (kV), up to 34.5 kV, up to 38 kV, up to 69 kV, or 69 kV or higher. The electrical power distribution system 100 is an alternating current (AC) electrical network that operates at a fundamental frequency of, for example, 50 or 60 Hertz (Hz). Additionally, the electrical power distribution system 100 may be a multi-phase system. For example, the electrical power distribution system 100 may be a three-phase system.

A distribution path 106 electrically connects an electrical device 101 to the distribution system 100, such that the device 101 receives AC electrical power 105 from the distribution system 100 and/or provides AC electrical power 105 to the distribution system 100. The distribution path 106 is any type of mechanism for conducting AC electricity and may include, for example, one or more distribution lines, electrical cables, and/or transmission lines. The electrical device 101 may be any type of device that utilizes, interacts with, or provides electricity. For example, the electrical device 101 may be a generator, a solar panel system, a transformer, a circuit breaker, a motor, a capacitor bank, a switchgear, a renewable energy source, or a lighting system, just to name a few. The electrical power distribution 100 may include electrical devices in addition to the device 101.

A surge arrester 150A is electrically connected to the distribution path 106. The surge arrester 150A is a fire-mitigating surge arrester and is configured to mitigate or eliminate the risk of igniting a fire in objects in the vicinity of the arrester 150A, as discussed further below. The surge arrester 150A also protects the electrical device 101 from over-voltage conditions. Over-voltage conditions are present when the voltage on the distribution path 106 exceeds the safe operating voltage of the electrical device 101. Over-voltage conditions may be caused by, for example, lightning strikes or transients that may occur during switching operations. The surge arrester 150A may be a distribution class arrester with a rated voltage of, for example, 27 kilovolts (kV) or 36 kV and the ability to conduct fault currents of, for example, up to 12 kiloamperes (kA) root-mean-squared (RMS) or up to 20 kA RMS.

The surge arrester 150A includes a first terminal 152, a second terminal 153, and an arrester module 151. The terminal 152 is electrically connected to the distribution path 106. The terminal 153 is electrically connected to ground. The arrester module 151 is electrically connected to the distribution path 106 via the first terminal 152. Referring also to FIG. 1B, the arrester module 151 includes an inner arrester module 165 in an interior region 184 of a cartridge 180. The cartridge 180 includes a cylindrical or tube-like sidewall 183. In the example of FIG. 1B, the cross-section of the sidewall 183 is shown with vertical line shading. The interior region 184 is defined by an interior surface 187 of the sidewall 183. The sidewall 183 includes one or more exhaust regions 185. The inner arrester module 165 is shown with a dotted line style in FIG. 1B to indicate that is inside the interior region 184 and is surrounded by the sidewall 183.

The inner arrester module 165 includes one or more electrically conductive elements 160 (for example, one or more metal oxide varistors (MOV)). The electrically conductive element 160 has a very high impedance at low voltages and a very low impedance at high voltages, where the high voltages are voltages that meet or exceed the rated voltage of the surge arrester 150A and the low voltages are voltages that are less than the rated voltage of the surge arrester 150A. The configuration of the arrester module 151 is selected to determine the rated voltage, and the rated voltage of the surge arrester 150A is selected to provide the correct clamping voltage for the application. When the voltage on the distribution path 106 is lower than the rated voltage of the surge arrester 150A, little to no electrical current is conducted by the element or elements 160. When the voltage on the distribution path 106 meets or exceeds the rated voltage of the surge arrester 150A, the impedance of the electrically conductive element 160 of the inner arrester module 165 becomes very low. Accordingly, when a voltage surge causes an over-voltage condition on the distribution path 106, the inner arrester module 165 provides a low-impedance path to ground. Thus, during an over-voltage condition, the surge arrester 150A conducts large amounts of fault current to ground to protect the electrical device 101 from the over-voltage condition.

The surge arrester 150A includes one arrester module (the arrester module 151). However, more than one arrester module may be included in a single surge arrester. For example, and referring to FIG. 1C, a surge arrester 150C includes three arrester modules 151a, 151b, and 151c. Each arrester module 151a, 151b, 151c is similar to the arrester module 151. In the surge arrester 150C, the arrester module 151b is electrically connected to the arrester module 151a via a connection mechanism 154. The arrester module 151b is also electrically connected to the arrester module 151c via a connection mechanism 155. The arrester module 151c is electrically connected to the ground terminal 153. The connection mechanisms 155 and 154 are made of an electrically conductive material, for example, a metal such as copper or aluminum, or an electrically conductive adhesive, such that the connection mechanism 154 electrically connects the arrester modules 151a and 151b, and the connection mechanism 155 electrically connects the arrester modules 151*b* and 151*c*. The connection mechanisms 154 and 155 also provide a mechanical connection between two adjacent modules.

The surge arresters 150A and 150C are provided as examples, and other configurations are possible. For example, the surge arrester 150C may be implemented with two arrester modules, four arrester modules, or more than four arrester modules. Moreover, the arrester module 151 may include additional features other than those shown in FIG. 1B. For example, the arrester module 151 may include a reinforcement structure on an outer side of the sidewall 183 (such as the reinforcement structure 272 discussed with respect to FIGS. 2A and 2B).

A traditional surge arrester includes a single column of electrically conductive material that extends from an electrical connection point on a first end of the arrester to a ground connection point on a second end of the arrester. The single column of electrically conductive material conducts fault current to ground during a failure mode (for example, under over-voltage conditions) and otherwise acts as an electrical insulator or a high-impedance element. The single column of electrically conductive material may be, for example, a bonded stack of metal-oxide-varistor (MOV) blocks made of a metal oxide ceramic, for example, zinc oxide (ZnO), or an elongated, monolithic MOV. When the traditional surge arrester is in the failure mode, an arc may form between the electrical connection point on the first end of the arrester and the ground connection point on the second end of the arrester. The arc may cause molten metal, hot gasses, and other debris to be ejected from the arrester. The ejected debris may lead to hazardous conditions. For example, the ejected debris may ignite flammable materials in the vicinity of the arrester.

On the other hand, the surge arrester 150A includes the arrester module 151, and the surge arrester 150C includes the arrester modules 151*a*, 151*b*, 151*c*. As discussed further below, the configuration of the arrester module mitigates ejected debris and reduces or eliminates the likelihood of igniting flammable materials in the vicinity of the arrester. Furthermore, the size and shape of the surge arrester 150A and the surge arrester 150C are the same as a traditional surge arrester having the same voltage rating. Thus, the segmented surge arrester 150A or the surge arrester 150C may be easily installed into existing infrastructure and does not require end users to modify mounting structures or provide additional space or equipment.

Figure 2A:
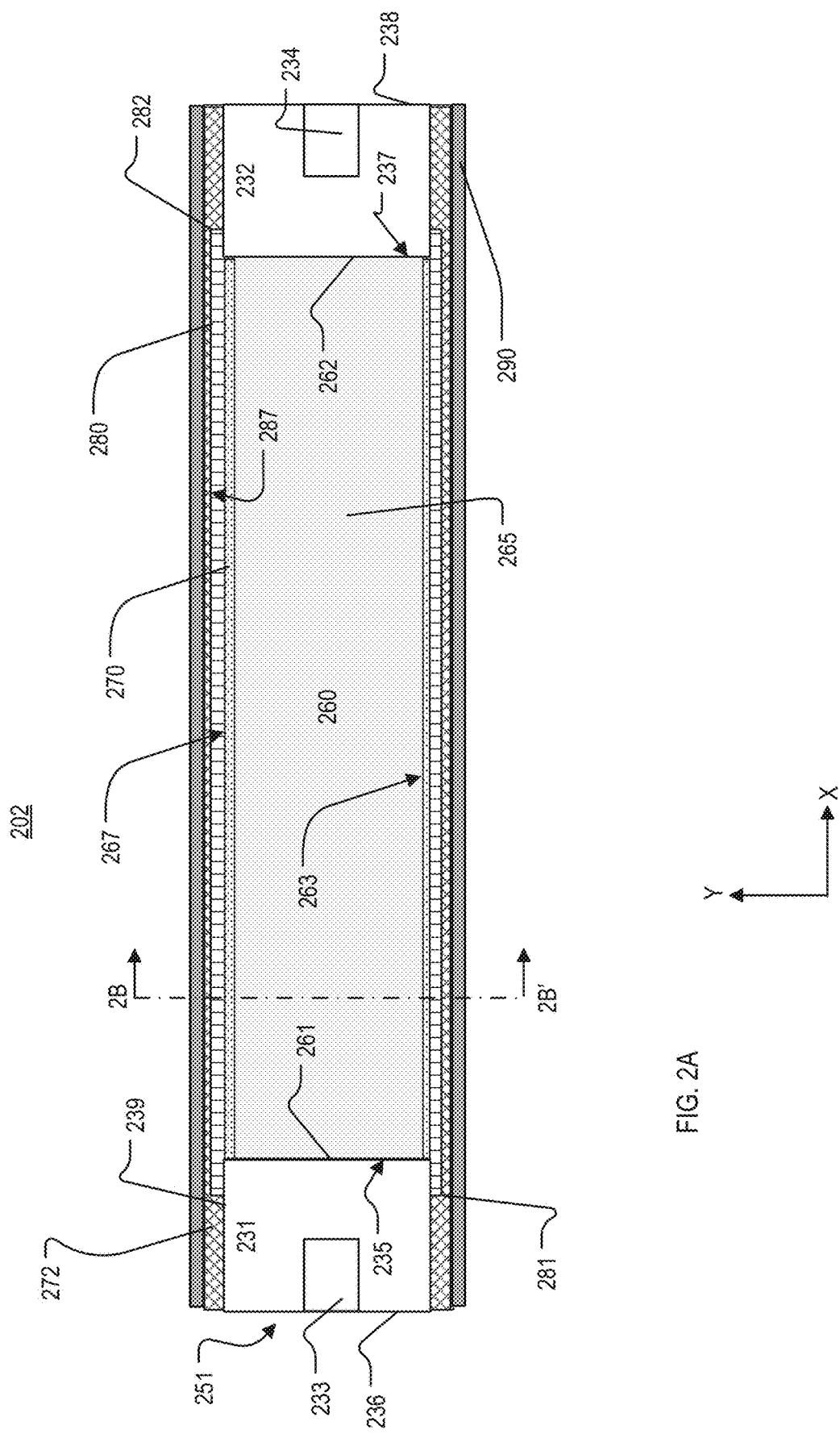
FIG. 2A is a side cross-sectional view of an example of an assembly for a fire-mitigating surge arrester.
Figure 2B:
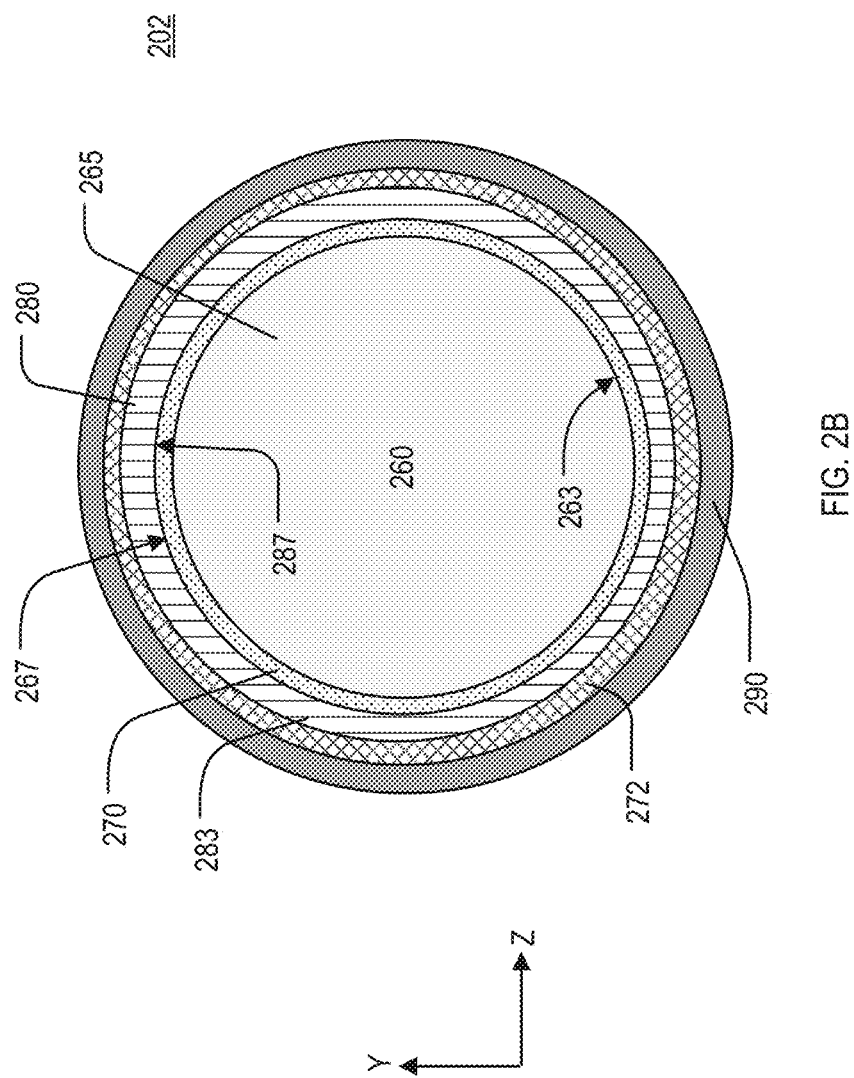
FIG. 2B is a cross-sectional view of the assembly of FIG. 2A taken at the line 2B-2B' shown in FIG. 2A.

FIG. 2A is a side cross-sectional view of an assembly 202 for a fire-mitigating surge arrester in the X-Y plane. The assembly 202 includes an arrester module 251 in an exterior housing 290. FIG. 2B is a cross-sectional view of the assembly 202 in the Y-Z plane taken at the line 2B-2B' shown in FIG. 2A. FIG. 2D is a side cross-sectional view of a fire-mitigating surge arrester 250 that includes three instances of the arrester module 251 (labeled as 251*a*, 251*b*, 251*c*). The arrester module 251 is an example of an arrester module that may be used in the fire-mitigating surge arrester 150A (FIG. 1A) or the fire-mitigating surge arrester 150C. For example, the arrester module 251 may be used in place of the arrester module 151*a*, 151*b*, or 151*c*.

Referring to FIGS. 2A and 2B, the arrester module 251 includes an inner arrester module 265. The inner arrester module 265 includes an electrically conductive assembly 260 (solid light grey shading) and a first reinforcement structure 270 (shown with a dotted shading pattern). The electrically conductive assembly 260 extends from a first end 261 to a second end 262. In the example of FIG. 2A, the electrically conductive assembly 260 is generally cylindrical in shape and has a circular cross section. The first reinforcement structure 270 is attached to an outer surface 263 of the electrically conductive assembly 260 to form the inner arrester module 265. The inner arrester module 265 has an outer surface 267, which is substantially circular in the Y-Z plane.

In the example of FIGS. 2A and 2B, an outer surface 263 of the electrically conductive assembly 260 is a circle in the X-Y plane. The electrically conductive assembly 260 includes one or more components that form a low-impedance current path at voltages that meet or exceed the rated voltage of the surge arrester 250. The electrically conductive assembly 260 may include, for example, a single MOV, a stack of two or more bonded MOV disks, or one or more electrodes. The electrically conductive assembly 260 may include elements that are not in physical contact but nonetheless provide a current path for fault current. For example, the electrically conductive assembly 260 may include electrodes that are spatially separated, such as the electrode blocks 721*a* and 721*b* of FIGS. 7A and 7B. In some implementations, a combination of different types of electrically conductive component are used as the electrically conductive assembly 260.

The first reinforcement structure 270 provides mechanical support to the electrically conductive assembly 260. The mechanical support provided by the first reinforcement structure 270 helps the electrically conductive assembly 260 withstand the thermal and mechanical forces that occur when the fault current flows in the electrically conductive assembly 260. For example, the first reinforcement structure 270 may prevent or reduce the formation of molten metal or other fragments and may prevent cracking in the electrically conductive assembly 260. In implementations in which the electrically conductive assembly 260 includes more than one electrically conductive component, the first reinforcement structure 270 provides longitudinal compression (along the X axis of FIG. 2A) and helps to maintain electrical contact between the various components.

The first reinforcement structure 270 may be, for example, a woven fabric, a tape, a sheet, matrix, or a strip of fibers that are pre-impregnated with a material such as resin. The fibers are fibers of any type of insulating material and may be, for example, fiberglass fibers. The first reinforcement structure 270 may cover all or part of the electrically conductive assembly 260. In the example of FIGS. 2A and 2B, the first reinforcement structure 270 covers the cylindrically shaped outer surface 263. However, other implementations are possible. For example, the first reinforcement structure 270 may cover part of the outer surface 263, or the reinforcement structure 270 may cover all of the outer surface 263, as well as portions of the first end 261, and the second end 262.

The first reinforcement structure 270 may be attached to the electrically conductive assembly 260 in any manner. For example, the first reinforcement structure 270 may be wound or wrapped around the outer surface 263. In another example, the first reinforcement structure 270 is formed from strips of material that are attached to the outer surface 263 along the X direction.

Figure 2C:
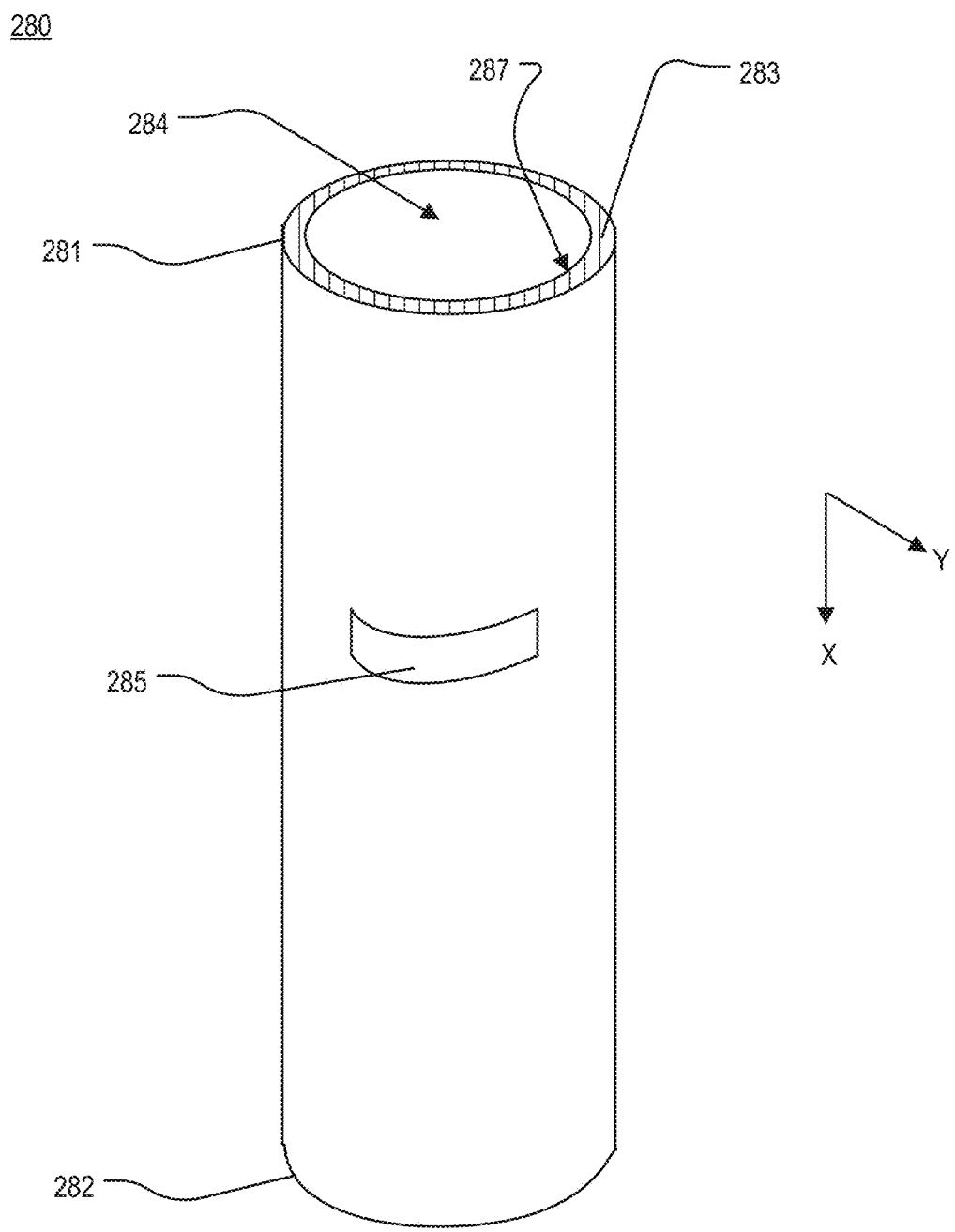
FIG. 2C is a perspective view of an example of a cartridge for a fire-mitigating surge arrester.

The arrester module 251 also includes a cartridge 280. FIG. 2C is a perspective view of the cartridge 280. In the example of FIGS. 2A-2C, the cartridge 280 is generally cylindrical and includes a sidewall 283 (shown with vertical striped shading) that extends along the X axis from a first end 281 to a second end 282. The cartridge 280 may be made of any durable solid material. For example, the cartridge 280 may be made of an epoxy fiberglass. The sidewall 283 may have a radial thickness of, for example, 0.125 to 0.150 inches (3.175 millimeters to 3.81 millimeters).

The sidewall 283 includes an exhaust region 285. The exhaust region 285 may be an opening that passes through the sidewall 283. In some implementations, the exhaust region 285 is a weakened point that does not necessarily pass through the sidewall 283. For example, the exhaust region 285 may be a region of the sidewall 283 that is thinner in the radial direction than the rest of the sidewall 283. The exhaust region 285 may be any shape or size. For example, the exhaust region 285 may be rectangular, circular, elliptical, or square.

FIGS. 3-5 are perspective views of cartridges 380, 480, and 580, respectively. The cartridges 380, 480, and 580 may be used in the fire-mitigating arrester 150A (FIG. 1A), 150C (FIG. 1C), or 250 (FIG. 2D). The cartridge 380 includes a cylindrical sidewall 383, which includes exhaust regions 385A and 385B. The exhaust regions 385A and 385B are identically sized and shaped rectangular openings that pass through opposite sides of the sidewall 383. In other words, the exhaust regions 385A and 385B are circumferentially spaced from each other by 180 degrees (°). The rectangular exhaust regions 385A and 385B have their greatest extent along the X axis. The centers of the exhaust regions 385A and 385B are aligned with each other.

The cartridge 480 includes a cylindrically shaped sidewall 483 that includes four exhaust regions 485A to 485D. The regions 485A and 485B are similar to the regions 385A and 385B. The regions 485C and 485D are rectangular openings in the sidewall 483. The regions 485C and 485D have their shortest extent along the X axis. The region 485C is displaced in the −X direction relative to the region 485A and is circumferentially spaced relative to the region 485C by about 90° counterclockwise with the X direction going into the page. The region 485D is displaced in the X direction relative to the region 485C. The sidewall 483 also may include additional exhaust regions that are opposite to the regions 485C and 485D.

The cartridge 580 includes a cylindrically shaped sidewall 583 that has exhaust regions 585A to 585F. The exhaust regions 585A and 585D are elliptically shaped openings in the sidewall 583. The exhaust regions 585B, 585C, 585E, and 585F are rectangular shaped openings in the sidewall 583. The exhaust regions 585A to 585F are arranged in a somewhat random pattern in the sidewall 583 and the exhaust regions 585A to 585F are different shapes, sizes, and orientations.

The cartridges 280, 380, 480, and 580 are provided as examples, and other configurations may be used. For example, exhaust regions may be arranged in a linear or grid pattern.

Returning to FIG. 2C, prior to assembling the module 251, the first end 281 and the second end 282 of the cartridge 280 are open, and an interior surface 287 of the sidewall 283 defines an open interior region 284. As shown in FIGS. 2A and 2B, the inner arrester module 265 is in the interior region 284 and is surrounded by the sidewall 283. To form the module 251, an end 235 of the electrically conductive component 231 is inserted into or joined to the first end 281 of the cartridge 280. The electrically conductive component 231 is any type of electrically conductive component and may be or include, for example, an electrode, a MOV disk, or a MOV block. The electrically conductive component 231 is electrically connected to the end 261 of the electrically conductive assembly 260. For example, the electrically conductive component 231 may be bonded to the end 261 with an electrically conductive adhesive or the electrically conductive component 231 may be bolted to the end 261. In another example, a spring washer holds the electrically conductive component 231 to the end 261. An end 237 of an electrically conductive component 232 is inserted into or joined to the second end 282 of the cartridge 280. The electrically conductive component 232 is any type of electrically conductive component and may be the same size, shape, and material as the electrically conductive component 232.

The electrically conductive component 231 includes a connection point 233 on a side 236 of the component 231. The side 236 is opposite to the end 235 that is joined to the electrically conductive assembly 260. The connection point 233 is configured to allow the module 251 to electrically and mechanically connect to another instance of the module 251 or to an electrical terminal. The connection point 233 may be a bore that extends into the electrically conductive component 231 in the X direction. The bore may be threaded.

Similarly, the electrically conductive component 232 includes a connection point 234 that is configured to allow the module 251 to mechanically and electrically connect to another instance of the module 251 or to an electrical terminal. The connection point 234 is on a side 238 of the electrically conductive component 232. The side 238 is opposite to the end 237 of the component 232. The connection point 234 extends into the electrically conductive component 232 in the −X direction. The connection point 234 may be a bore and may include threads. Other implementations of the connection points 233 and 234 are possible. For example, the modules 251a and 251b and 251c may be held together with an electrically conductive adhesive.

The cartridge 280 and the electrically conductive components 231 and 232 form a body that has an outer surface 239. A second reinforcement structure 272 (shown with cross-hatch shading) is placed on the outer surface 239. The second reinforcement structure 272 provides mechanical support to the body formed by the cartridge 280 and the electrically conductive components 231 and 232. The second reinforcement structure 272 includes fibers and a resin material in any configuration as discussed with respect to the first reinforcement structure 270. The second reinforcement structure 272 may be attached to the outer surface 239 in any manner. For example, the second reinforcement structure 272 may be wrapped around the outer surface 239 in a helical or coiled manner or placed along the outer surface 239 in the X direction. The second reinforcement structure 272 may cover all or part of the outer surface 239, and the second reinforcement structure 272 may cover the exhaust region 285.

An insulated housing 290 (shown with solid dark grey shading) surrounds the second reinforcement structure 272. The insulating housing 290 is made out of an electrically insulating material such as, for example, a polymer. The insulated housing 290 has a circular cross-section in the Y-Z plane and surrounds the module 251. The housing 290 may include insulating sheds, such as the sheds 792 of FIGS. 7A and 7B.

FIG. 2D is a side cross-sectional view of the fire-mitigating arrester 250. The fire-mitigating arrester 250 includes a first electrical terminal 252 and a second electrical terminal 253. The first electrical terminal 252 is configured to be electrically connected to an electrical distribution path that is also electrically connected to equipment to be protected. For example, the electrical terminal 252 may be connected to the distribution path 106 of FIG. 1A. The second electrical terminal 253 is configured to be connected to ground. The segmented arrester 250 includes three instances of the module 251, labeled as 251a, 251b, 251c. The modules 251a, 251b, and 251c are identical.

The connection point 233 of the module 251 is electrically and mechanically connected to the electrical terminal 252 by a fastener 256. The fastener 256 is any type of electrically conductive fastening device, such as a metal bolt, rod, or pin. The connection point 233, the fastener 256, and the electrical terminal 252 are made of electrically conducting material. Thus, physically connecting the connection point 233, the fastener 256, and the electrical terminal 252 electrically and mechanically connects the module 251a and the terminal 252.

The connection point 234 of the module 251a is electrically and mechanically connected to the connection point 233 of the module 251b with an electrically conductive fastener 254. Similarly, the connection point 234 of the module 251b is electrically and mechanically connected to the connection point 233 of the module 251c with an electrically conductive fastener 255. The connection point 234 of the module 251c is electrically connected to the terminal 253 with an electrically conductive fastener 257. The fasteners 256, 254, 255, and 257 may be any type of electrically conductive fastener. For example, the fasteners 256, 254, 255, and 257 may be metallic bolts, rods, or pins. The fasteners 256, 254, 255, and 257 all may be identical or different. For example, in some implementations, the fasteners 254 and 255 are both metal bolts, and the fasteners 256 and 257 are metal rods.

In the example discussed above, the modules 251a, 251b, and 251c have identical structures and each includes the cartridge 280. However, the cartridge 280 may be oriented differently in each module 251a, 251b, 251c such that the exhaust regions 285 point in different directions. For example, if the end 281 of the cartridges 280 is in the Y-Z plane with the X direction going into the page, the modules 251a, 251b, and 251c may be oriented such that the exhaust region 285 of the module 251a at 90°, the exhaust region 285 of the module 251b is at 180°, and the exhaust region 285 of the module 251c is at 270°. Having the exhaust regions 285 point in different directions reduces the likelihood of the individual arcs that may form across each module 251a, 251b, 251c combining into a larger more energetic arc.

Furthermore, when the surge arrester 250 is in a failure mode, the arrester modules 251a, 251b, 251c form a low-impedance path to ground and conduct fault current to the ground terminal 253. Arcing may occur while the surge arrester 250 is in the failure mode. For example, an arc may form across each of the arrester modules 251a, 251b, and 251c. However, as compared to the arc that develops across the single column of electrically conductive material in the traditional surge arrester, the arc that may form across each arrester module 251a, 251b, 251c is shorter in length, less volatile, and less energetic. As a result, when more than one arrester module having the configuration of the arrester module 251a is used to make a segmented surge arrester (such as shown in FIG. 2D), the amount of ejected debris is eliminated or reduced as compared to a traditional surge arrester having the same voltage rating. Moreover, because each individual arcs that forms in the surge arrester 250 is less energetic than the larger arc that forms in a traditional arrester, debris that escapes from the surge arrester 250 is also less energetic and is less likely to cause damage to the surrounding environment. For example, the less energetic debris is less likely to ignite flammable objects outside of the surge arrester 250 and thus reduces the risk of fire during an over-voltage condition.

Moreover, although the arrester 250 includes three arrester modules 251a, 251b, 251c, other implementations are possible. For example, the surge arrester 250 may include one arrester module, two arrester modules, four arrester modules, or more than four arrester modules.

Figure 6A:
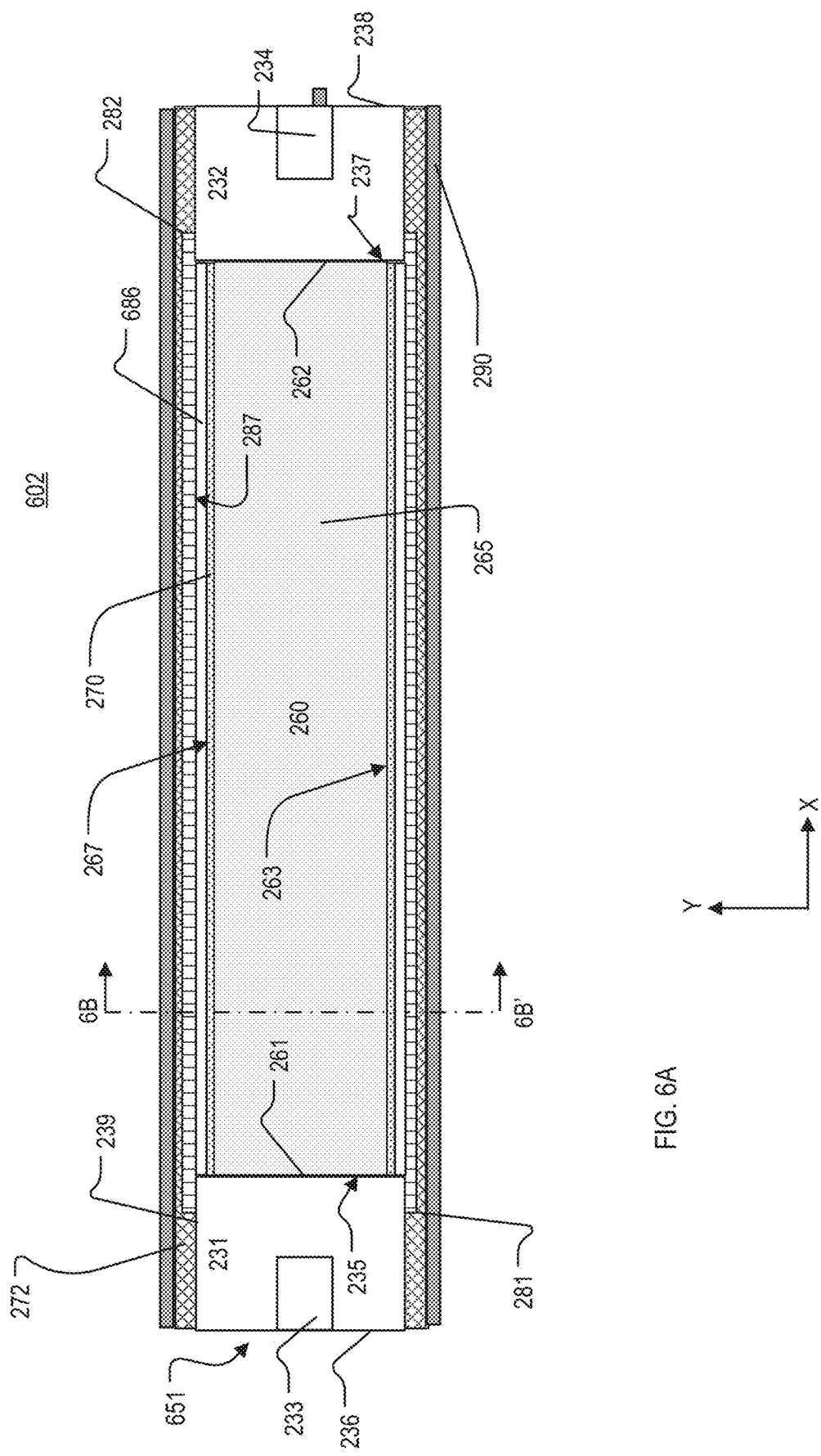
FIG. 6A is a side cross-sectional view of another example of an assembly for a fire-mitigating surge arrester.
Figure 6B:
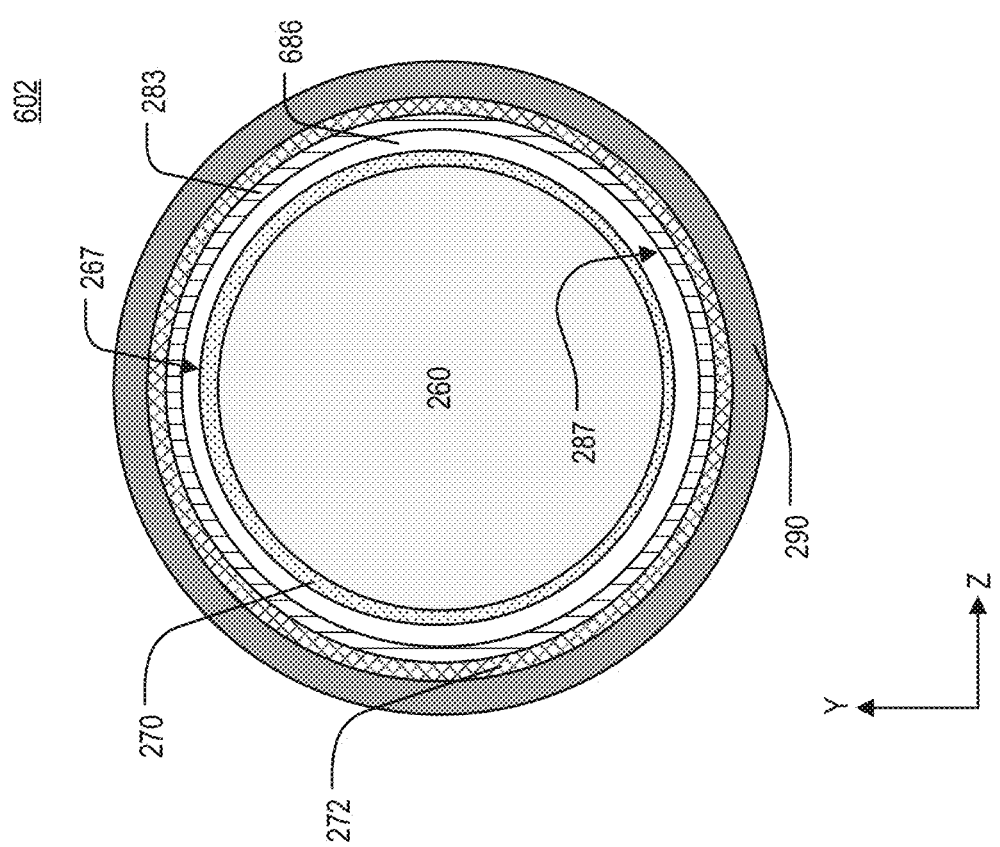
FIG. 6B is a cross-sectional view of the assembly of FIG. 6A taken at the line 6B-6B' shown in FIG. 6A.

FIG. 6A is a cross-sectional view of an assembly 602, which includes an arrester module 651 and the exterior housing 290, in the X-Y plane. The assembly 602 is another example of an assembly for a fire-mitigating surge arrester. FIG. 6B is a cross-sectional view of the assembly 602 in the Y-Z plane taken at the line 6B-6B' shown in FIG. 6A. The arrester module 651 is another example of an arrester module that may be used in the surge arrester 150A (FIG. 1A), the surge arrester 150C (FIG. 1C), or the surge arrester 250 (FIG. 2D). For example, the arrester module 651 may be used in place of the arrester module 151a, 151b, or 151c (FIG. 1C). The arrester module 651 also may be used in place of the arrester modules 251a, 251b, 251c (FIG. 2D).

The arrester module 651 is similar to the arrester module 251, except the interior surface 287 of the cartridge 280 and the inner arrester module 265 are spaced such that there is a gap or open region 686 between the interior surface 287 and the outer surface 267 of the inner arrester module 265. The distance between the surface 267 of the inner arrester module 265 and the interior surface 287 is between 0 inches and 0.25 inches (0 to 6.35 mm). FIGS. 2A and 2B show an implementation in which the distance between the inner arrester module 265 and the interior surface 287 is negligible, for example, zero or close to zero. FIGS. 6A and 6B show an implementation in which the distance between the inner arrester module 265 and the interior surface 287 is greater than zero.

In implementations in which the inner arrester module 265 includes the first reinforcement structure 270, the distance between the outer surface 267 and the interior surface 287 is the radial distance between the first reinforcement structure 270 and the interior surface 287. However, the inner arrester module 265 does not necessarily include the first reinforcement structure 270. In implementations in which the inner arrester module 265 lacks the first reinforcement structure 270, the distance between the outer surface 267 and the interior surface 287 is the distance between the outer surface 263 and the interior surface 287.

Figure 8A:
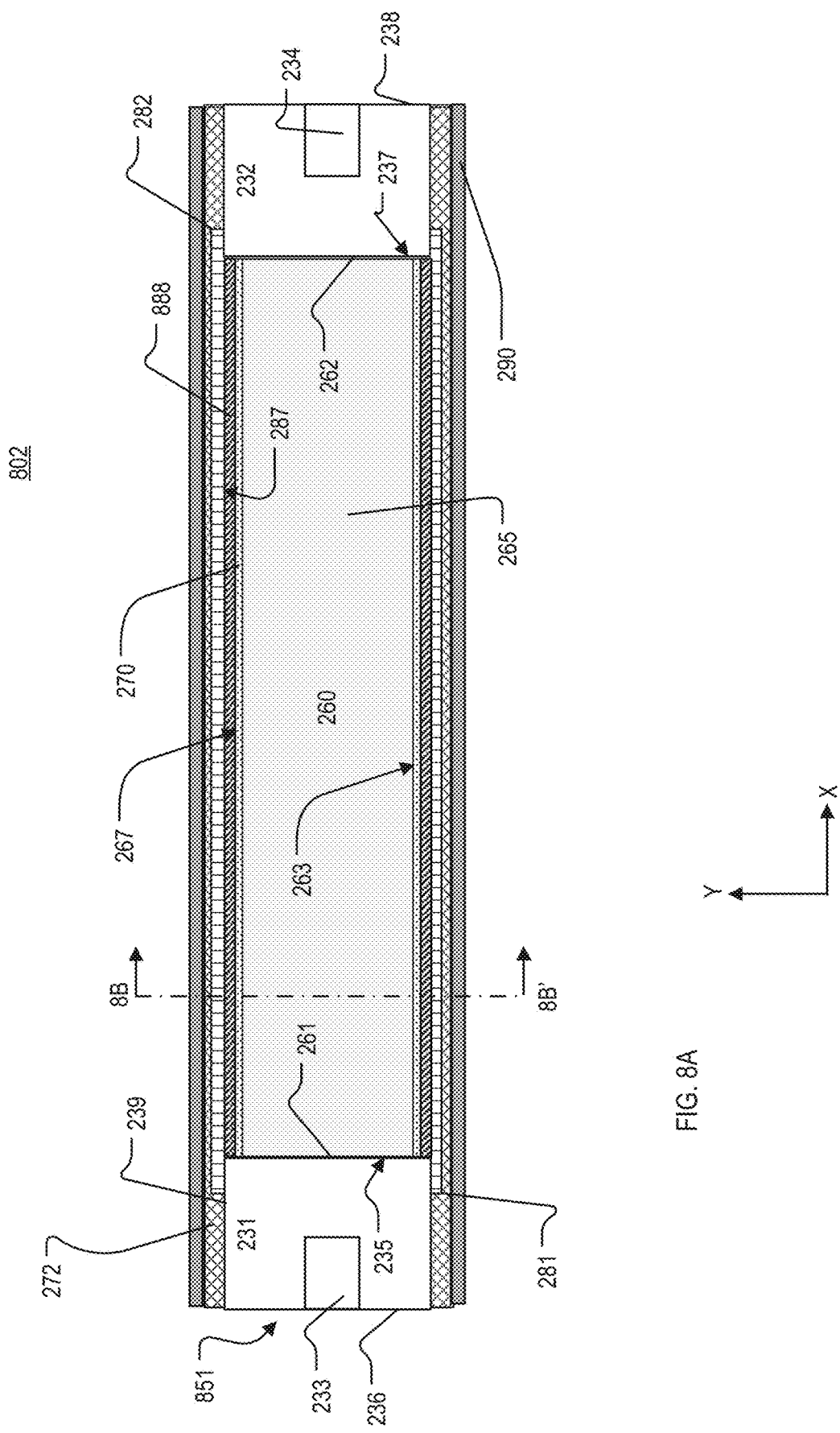
FIG. 8A is a side cross-sectional view of another example of an assembly for a fire-mitigating surge arrester.
Figure 8B:
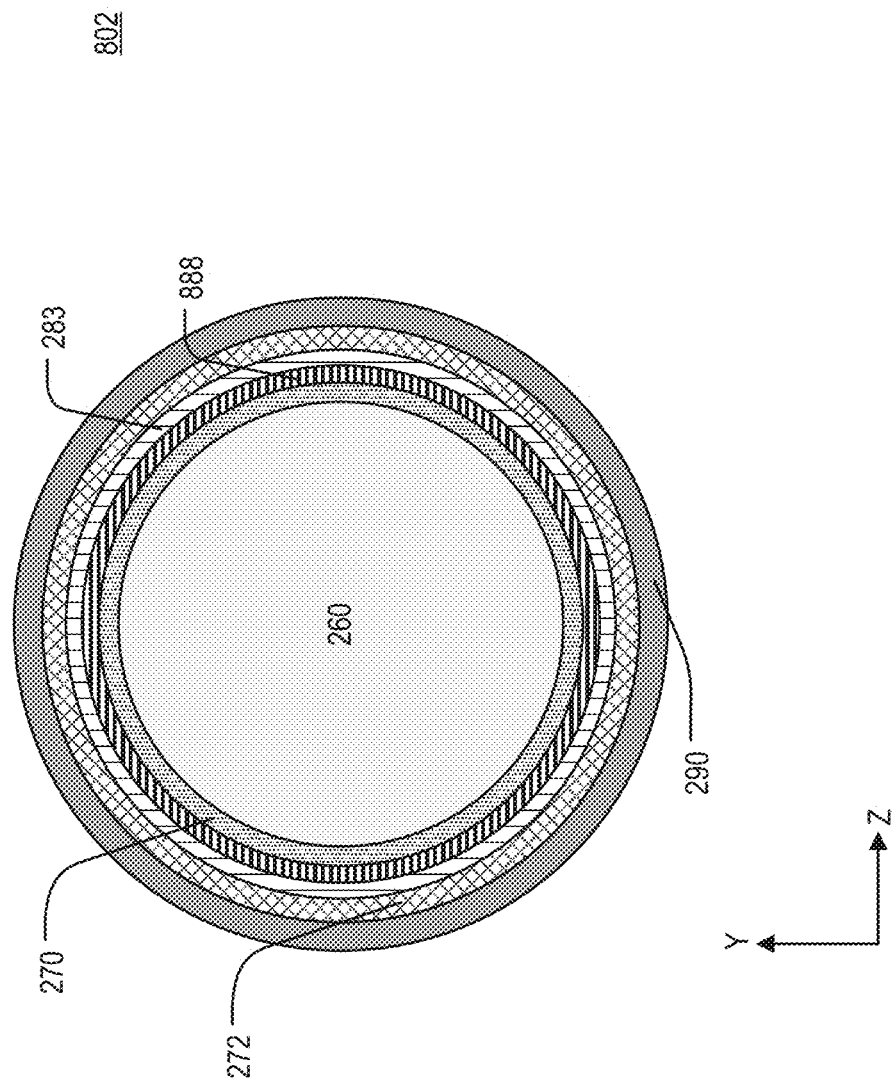
FIG. 8B is a cross-sectional view of the assembly of FIG. 8A taken at the line 8B-8B' shown in FIG. 8A.

The gap 686 may be filled with air, a fluid other than air, or a mixture of fluids. In some implementations, such as shown in FIGS. 8A and 8B, the gap 686 is filled with a fire-resistant material. The gap 686 helps to control and mitigate an arc that may form across the module 651 during a failure mode. The gap 686 is an open volume that surrounds the inner arrester module 265. If an arc forms across the module 651, the heat generated by the arc increases the temperature and pressure in the module 651, and debris may be released from the electrically conductive assembly 260 through the exhaust region 285. The presence of the gap 686 increases the volume of space in which the arc occurs and provides an open region into which the debris enters. The presence of the gap 686 thus reduces the overall pressure generated by the arc. As a result, the amount of molten metal and hot gasses that could otherwise be expelled through the housing 290 are reduced or eliminated or are expelled in a relatively controlled manner. Because fewer heated materials are emitted through the exterior housing 290, thereby reducing the risk of igniting flammable materials in the vicinity is reduced.

Figure 7A:
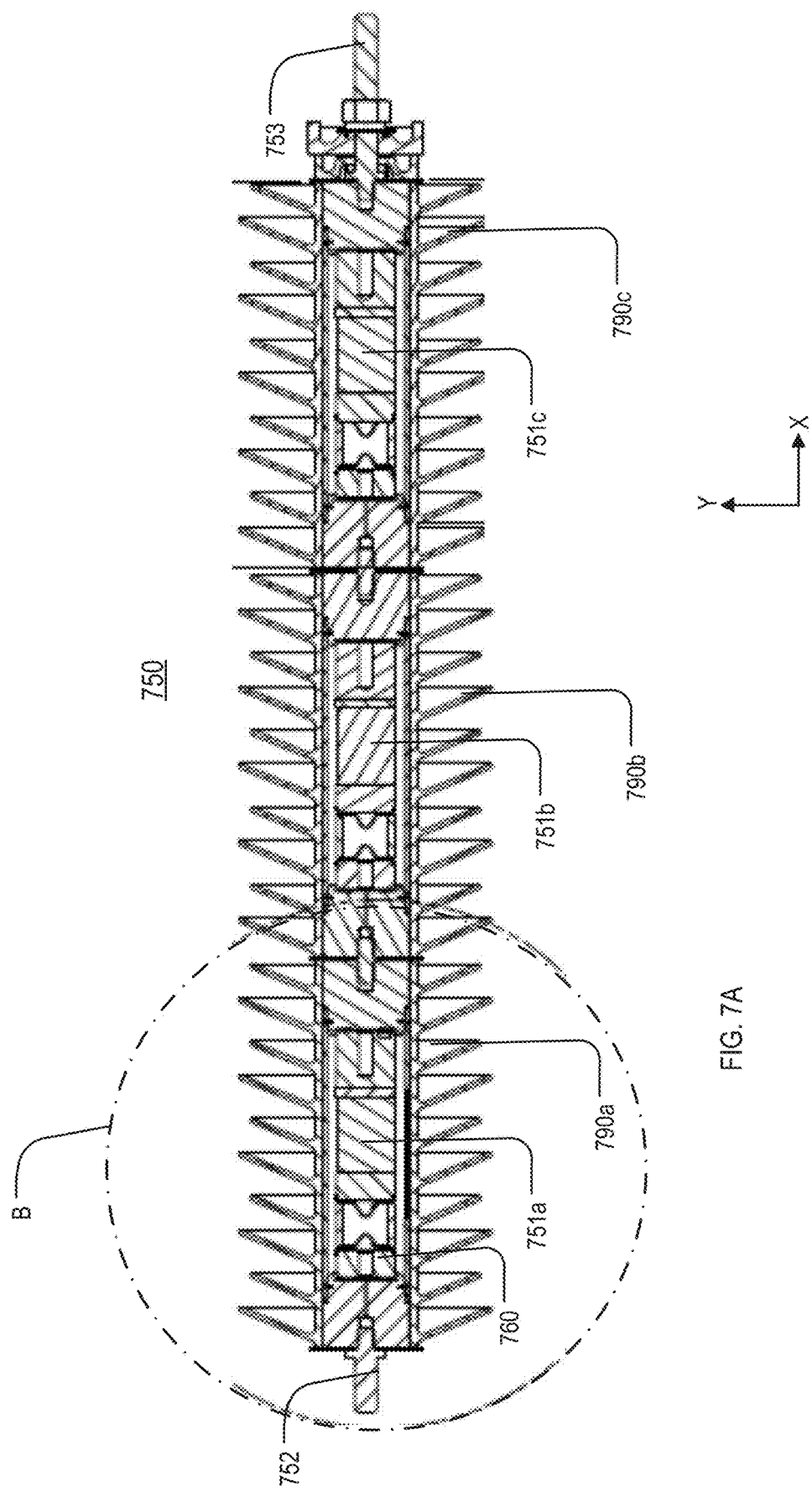
FIG. 7A is a side cross-sectional view of another example of a fire-mitigating surge arrester.
Figure 7B:
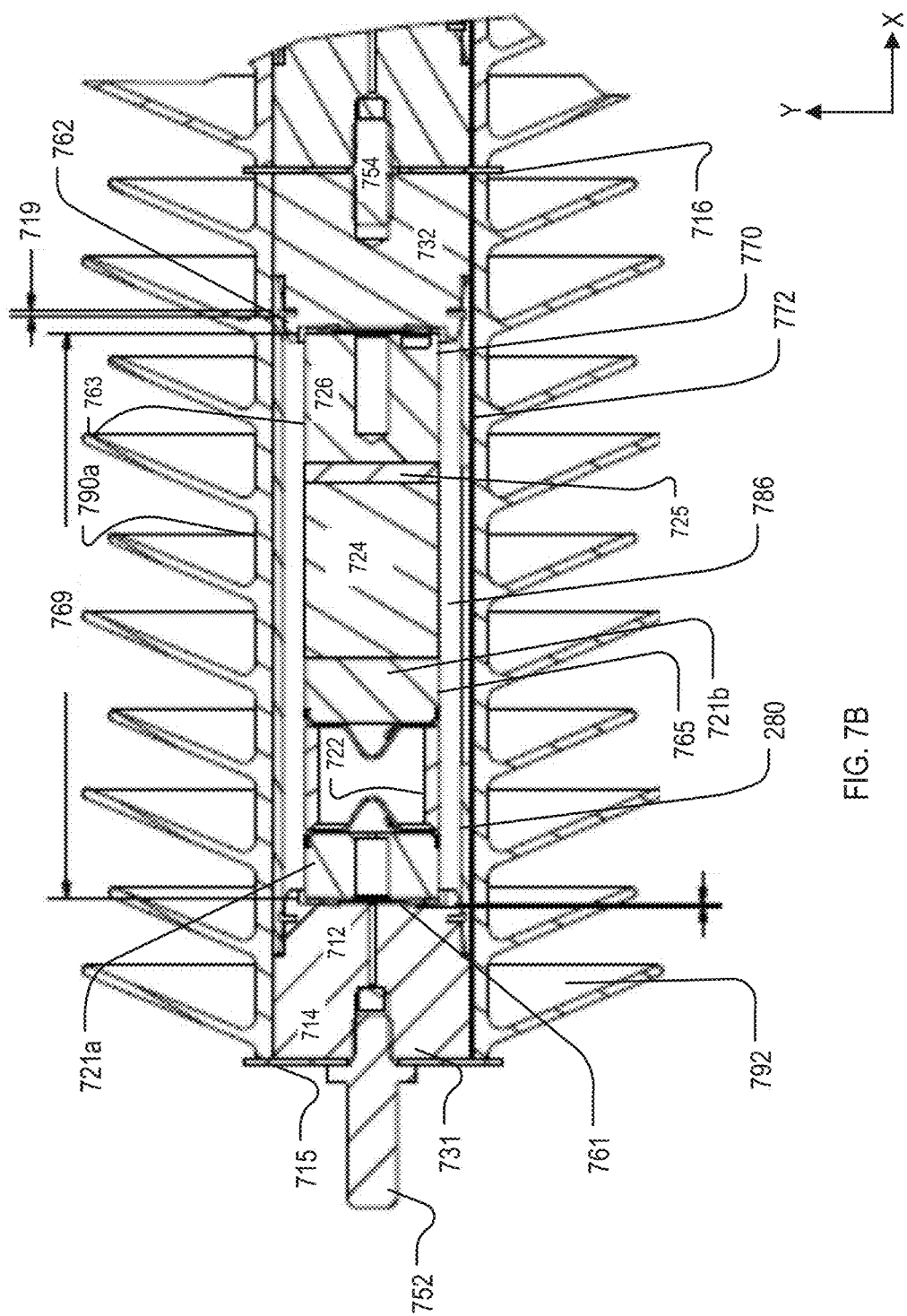
FIG. 7B is a cross-sectional view of a portion B of the surge arrester of FIG. 7A.

FIG. 7A is a side cross-sectional view of a fire-mitigating surge arrester 750 in the X-Y plane. FIG. 7B is a cross-sectional view of a portion B of the surge arrester 750 in the X-Y plane. The portion B is indicated by a circle with a dash-dot line style in FIG. 7A.

Referring to FIG. 7A, the surge arrester 750 includes arrester modules 751a, 751b, and 751c. The arrester module 751a is electrically connected to a first electrically conductive terminal 752. The first electrically conductive terminal 752 may be made of a metal or metal alloy such as, for example, brass, copper, or aluminum. The arrester module 751a is also electrically connected to the arrester module 751b, and the arrester module 751b is electrically connected to the arrester module 751c. The arrester module 751c is electrically connected to a second electrically conductive terminal 753. The second electrically conductive terminal 753 may be made of a metal or metal alloy such as, for example, brass, copper, or aluminum.

Referring to FIG. 7B, the configuration of the arrester module 751a is discussed in more detail. The arrester modules 751b and 751c are substantially identical to the arrester module 751a and thus are not discussed in more detail. The arrester module 751a includes a first electrode block 721a and a second electrode block 721b. The first and second electrode blocks 721a and 721b are held at opposite ends of a cylindrically shaped retaining ring 722 and are separated from each other along the X direction. The first and second electrode blocks 721a and 721b are made of any electrically conductive material. For example, the electrode blocks 721a and 721b may be made of a metal such as copper or aluminum or an alloy such as brass. The second electrode block 721b is in physical contact with a MOV disk 724. The MOV disk 724 is in physical contact with yet another electrode 725, which is in physical contact with an electrode 726. Like the first and second electrode blocks 721a and 721b, the electrodes 725, 726 are made of an electrically conductive material. Thus, the MOV disk 724 and the electrodes 725, and 726 are in electrical contact with each other and with the second electrode block 721b by virtue of being in physical contact.

Together, the first electrode block 721a, the second electrode block 721b, the MOV disk 724, the electrode 725, and the electrode 726 form an electrically conductive assembly 760. The electrically conductive assembly 760 has a generally cylindrical shaped outer surface 763 that extends along the X direction from a first end 761 to a second end 762 and has an extent 769 along the X direction. The extent may be, for example, 5 to 7 inches (12.7 to 17.8 centimeters).

A first reinforcement structure 770 is attached to the outer surface 763. Together, the first reinforcement structure 770 and the electrically conductive assembly 760 form an inner arrester module 765. The first reinforcement structure 770 is similar to the first reinforcement structure 270 discussed above. The first reinforcement structure 770 applies radial and longitudinal (X axis) compression to the electrically conductive assembly 760. The first reinforcement structure 770 helps to maintain physical contact between the second electrode block 721b, the MOV disk 724, the electrode 725, and the electrode 726, and also helps to maintain the connection between the retaining ring 722 and the first and second electrode blocks 721a, 721b. The inner arrester module 765 is surrounded by the sidewall 283 (FIG. 2C) of the cartridge 280. The cartridge 280 is discussed as an example, and other configurations may be used. For example, any of the cartridges 380, 480, and 580 may be used instead of the cartridge 280.

The first end 761 of the electrically conductive assembly 760 is electrically connected to a first cylindrical region 712 of a first electrically conductive component 731. The diameter of the electrically conductive assembly 760 in the X direction is less than the diameter of the region 712. The electrically conductive component 731 also has a cylindrically shaped second region 714. The second region 714 has a larger diameter in the Y direction than the first region 712. The diameter of the first region 712 is substantially the same as the diameter of the opening of the first end 281 (FIG. 2C) of the cartridge 280. The sidewall 283 is slid over the electrically conductive assembly 760 and the first region 712 is inserted into the open first end 281 (FIG. 2C) and held in contact with the interior surface 287 by a clip 719 (labeled on the opposite end of the arrester module 751a). Because the diameter of the electrically conductive assembly 760 is less than the diameter of the first region 712, an air-filled gap 786 exists between the interior surface 287 of the cartridge 280 and the first reinforcement structure 770. The air-filled gap 786 performs the same functions as the gap 686 discussed above with respect to FIGS. 6A and 6B An electrically conductive component 732, which is substantially identical to the electrically conductive component 731, is attached to the second end 282 of the cartridge 280 in a similar manner. The electrically conductive components 731 and 732 and the cartridge 280 form a cylindrical body that extends in the X direction. A second reinforcement structure 772 is placed on the outer surface of the sidewall 283 and the outer surface of the region 714 of the electrically conductive components 731, 732 to form the arrester module 751a. The second reinforcement structure 772 is similar to the second reinforcement structure 272. The second reinforcement structure 772 provides mechanical support to the body formed by the first and second electrically conductive components 231, 232 and the cartridge 280.

The arrester module 751a is inside an insulating housing 790a. The second reinforcement structure 772 is in direct physical contact with an inner wall of the insulating housing 790a and may be sealed to the inner wall of the insulating housing 790a. The insulating housing 790a may be, for example, a polymer housing. The insulating housing 790a includes sheds 792 that extend outward. An end plate 715 is captured between the second region 714 of the electrically conductive component 731 and the terminal 752. The arrester module 751a is electrically and mechanically connected to the arrester module 751b by an electrically conductive fastener 754. The fastener 754 may be, for example, a metal bolt. An end plate 716 is captured between the arrester module 751a and the arrester module 751b.

Each of the arrester modules 751a, 751b, and 751c is within a separate respective exterior housing 790a, 790b, and 790c. When the arrester modules 751a, 751b, and 751c are joined together to form the surge arrester 750, the exterior housings 790a, 790b, 790c provide insulation and protection for the arrester 750 by insulating and protecting the respective arrester modules 751a, 751b, and 751c.

The surge arrester 750 may have other configurations. For example, in some implementations, the arrester modules 751a, 751b, and 751c are joined together first and then an insulating polymer housing is overmolded over all of the arrester modules 751a, 751b, and 751c. These implementations do not include an end plate between the arrester modules 751a and 751b or an end plate between the arrester modules 751b and 751c. In these implementations, the insulating housing 790 is a unitary piece of polymer.

In operational use of the surge arrester 750, the first electrically conductive terminal 752 is electrically connected to an electrical distribution path, such as the distribution path 106, and the second electrically conductive terminal 753 is electrically connected to ground. The surge arrester 750 has a rated voltage that depends on the rated voltage of each of the arrester modules 751a, 751b, and 751c. For example, if each of the arrester modules 751a, 751b, and 751c has a voltage rating of 9 kV, the rating of the surge arrester is 27 kV. Continuing this example, when the voltage on the distribution path is below 27 kV, the surge arrester 750 acts as an insulator because no electrical current is able to flow across the gap between the first electrode block 721a and the second electrode block 721b, and no electrical current is able to flow between the terminal 752 and the terminal 753. When the voltage exceeds 27 kV (the spark over voltage), the arrester modules 751a, 751b, 751c provide a low-impedance path between the terminal 752 and the terminal 753 and thus conducts fault current to shunt the voltage surge to ground. Although the first and second electrode blocks 721a and 721b are physically separated, when the voltage exceeds the spark over voltage, a spark is created across the gap between the block 721a and the block 721b and current flows between the terminal 752 and the terminal 753 until the voltage no longer exceeds the spark over voltage.

FIG. 8A is a cross-sectional view of an assembly 802, which includes an arrester module 851 and the exterior housing 290, in the X-Y plane. The assembly 802 is another example of an assembly for a fire-mitigating surge arrester. FIG. 8B is a cross-sectional view of the assembly 802 in the Y-Z plane taken at the line 8B-8B' shown in FIG. 8A. The arrester module 851 is another example of an arrester module that may be used in the surge arrester 150A (FIG. 1A) or the surge arrester 250 (FIG. 2D). For example, the arrester module 851 may be used in place of the arrester module 151a, 151b, or 151c (FIG. 1). The arrester module 851 also may be used in place of the arrester modules 251a, 251b, 251c (FIG. 2D). Furthermore, the arrester module 851 may be used in place of the arrester module 751a, 751b, or 751c in the surge arrester 750 (FIG. 7A).

The arrester module 851 is similar to the module 651 (FIGS. 6A and 6B), except a fire retardant material or fire resistant material 888 is in the gap or open region 686 between the interior surface 287 and the first reinforcement structure 270. The material 888 is shown with diagonal shading in FIGS. 8A and 8B. In the example shown in FIGS. 8A and 8B, the material 888 substantially fills the region 686. However, in other implementations, the material 888 only partially fills the region 686. The material 888 may be pre-formed and wedged, inserted, or pressed into the region 686 during assembly of the module 851; or the material 888 may be delivered (for example, sprayed or poured) into the region 686 during assembly of the module 851 and allowed to settle into the region 686.

The material 888 is any type of fire retardant or fire resistant material. The material 888 has at least some fluidity or porousness that allows air and/or other fluids to flow or move in the gap 686 even while the material 888 fills the gap 686. Moreover, the material 888 may vaporize or partially vaporize in the presence of fire. For example, the material 888 may be a foam that includes a flame retardant material, such as, for example, melamine.

As noted above, the module 851 may be used in any of the surge arresters 150A, 150C, 250, or 750 and may be electrically connected to the distribution path 106. When the voltage on the distribution path 106 exceeds the rated voltage of the arrester that includes one or more of the arrester modules 851, fault current flows in the electrically conductive assembly 260 and debris may be produced. The material 888 slows down, absorbs, and/or traps solid debris and/or liquid debris. The porous nature of the material 888 allows hot gasses to move within the gap 686 and through the exhaust regions 285, thus reducing the pressure of the gasses and eliminating or reducing the risk of the arrester exploding due to increased internal pressure. Moreover, in the presence of fire or extreme heat, the material 888 at least partially vaporizes, and the vapor is able to escape through the exhaust regions 285.

The material 888 thus may further reduce the risk of an over-voltage condition on the distribution path 106 causing a fire in flammable objects near the arrester. For example, by slowing down heated debris that may be created during an over-voltage condition, the material 888 reduces the distance that such materials travel. Thus, even if the debris escapes the arrester, the debris does not travel as far and is less likely to reach flammable objects in the vicinity of the arrester. Accordingly, the material 888 further reduces the risk of a fire igniting in flammable objects in the vicinity of the arrester.

FIG. 9 is a perspective view of a cartridge 980. The cartridge 980 is similar includes a cylindrical sidewall 983 that extends in the X direction. Two exhaust openings 985A and 985B pass through the sidewall 983. The exhaust openings 985A and 985B are filled with the material 888 (shown with slanted line shading).

The cartridge 980 may be used in the arrester module 251 (FIG. 2A), the arrester module 651 (FIG. 6A), or the arrester module 851 (FIG. 8A) instead of the cartridge 280. In other words, the material 888 in the openings 985A and 985B may be the only instance of the material in an arrester module (such as the example of using the cartridge 980 in the arrester module 651), or the arrester module may include the material 888 in the openings 985A and 985B and in the region 686 (such as the example of using the cartridge in the module 851). Moreover, other implementations are possible. For example, the material 888 may in the opening 985A but not in the opening 985B.

FIG. 10 is a block diagram of a test scenario 1000. The test scenario 1000 is used for a test of the spark production characteristics of a fire-mitigating surge arrester 1050. The arrester 1050 is any of the arresters 150A, 150C, 250, or 750. The test scenario 1000 may be used to test the arrester 1050 relative to the Cal-Fire-2008 standard or the AS1703.2 Spark A standard, for example.

In the test scenario 1000, the arrester 1050 was mounted to a cross-arm 1096 on a utility structure 1095 that is secured in the earth 1098. The utility structure 1095 may be, for example, a utility pole. The utility structure 1095 holds the cross-art 1096 and a distribution line (not shown). The arrester 1050 is electrically connected to the distribution line. The arrester 1050 is attached to the cross-arm 1096 such that the arrester 1050 is a distance 1097 above the earth 1098. The distance 1097 may be, for example, 8 to 10 feet.

Flammable objects 1099 are on the earth 1098 and in the vicinity of the arrester 1050. For example, the flammable objects 1099 may be directly below the arrester 1050 and, in these examples, the flammable objects 1099 are the distance 1097 from the arrester 1050. The flammable objects 1099 may be within a circular region that has a radius of 6 ft from the point that is directly below the arrester 1050. The flammable objects 1099 are any objects that are capable of catching on fire. For example, the flammable objects 1099 may be straw, brush, paper, or wood chips. Fault currents of 12 kA, 6 kA, 800 A, and 65 A were conducted by the surge arrester 1050 to simulate a failure mode of the surge arrester 1050. In one round of tests, the duration of the 12 kA and 6 kA currents were 0.2 seconds (s). The duration for the 800 A current was 2 s. The duration for the 65 A current was 10 s. In another round of performing the test, the duration for all currents was 0.2 s. The test scenario is considered successful if the failure mode of the arrester 1050 occurs without igniting the flammable materials 1099.

The arrester 1050 did not emit sparks or emitted insufficient sparks to ignite the flammable materials 1099. Moreover the flammable materials 1099 did not experience substantial damage. For example, the flammable materials 1099 were not substantially scorched. Thus, the arrester 1050 mitigates fire risk under failure conditions. A traditional surge arrester generally ignites the flammable objects 1099 when in the failure mode. However, the structure and arrangement of the surge arrester 1050 (as discussed above) improves its performance in the failure mode and greatly reduces the risk of fire as compared to a traditional surge arrester.

The above implementations are provided as examples, and other implementations are possible. For example, the inner arrester modules 265 and 765 do not necessarily include the first reinforcement structure 270.

What is claimed is:

1. A module for a surge arrester, the module comprising:
an inner arrester module comprising an electrically conductive assembly;
a cartridge comprising a first end, a second end, a sidewall that extends between the first end and the second end, and an exhaust region in the sidewall, wherein the sidewall surrounds the inner arrester module;
a first electrical component in contact with a first end of the electrically conductive assembly and the first end of the cartridge;
a second electrical component in contact with a second end of the electrically conductive assembly and the second end of the cartridge; and
a reinforcement structure on the sidewall, the first electrical component, and the second electrical component, wherein the reinforcement structure that is on the sidewall, the first electrical component, and the second electrical component is a second reinforcement structure; and the inner arrester module further comprises a first reinforcement structure on the electrically conductive assembly.

2. The module of claim 1, wherein a gap is between an interior surface of the sidewall and the inner arrester module.

3. The module of claim 2, wherein the exhaust region comprises at least one opening that passes through the sidewall.

4. The module of claim 3, wherein the exhaust region comprises a plurality of openings, and each of the plurality of openings passes through the sidewall.

5. The module of claim 3, wherein the exhaust region comprises two openings that pass through the sidewall, and the two openings are on opposite sides of the sidewall.

6. The module of claim 1, wherein the electrically conductive assembly comprises a first electrode and a second electrode that are separated from each other by an open region.

7. The module of claim 1, wherein one or more of the first reinforcement structure and the second reinforcement structure comprise fiberglass and resin.

8. The module of claim 1, wherein one or more of the first reinforcement structure and the second reinforcement structure comprise a pre-impregnated fiber matrix.

9. The module of claim 1, wherein the first electrical component comprises a first connection point configured to electrically connect the electrically conductive assembly to a first device, and the second electrical component comprises a second connection point configured to electrically connect the electrically conductive assembly to a second device.

10. The module of claim 9, wherein one or more of the first device and the second device is another module.

11. The module of claim 9, wherein the first connection point comprises a first bolt, and the second connection point comprises a second bolt.

12. The module of claim 1, further comprising an exterior housing surrounding the second reinforcement structure.

13. The module of claim 12, wherein an inner surface of the exterior housing is in contact with the second reinforcement structure.

14. The module of claim 2, further comprising a fire retardant material in the gap.

15. The module of claim 3, further comprising a fire retardant material in the gap and in at least one opening that passes through the sidewall.

16. A surge arrester comprising:
an exterior housing; and
at least one arrester module in the exterior housing, wherein each arrester module comprises:
a cartridge comprising a first end, a second end, a sidewall that extends between the first end and the second end, and one or more exhaust regions in the sidewall; and
an inner arrester module in the cartridge, the inner arrester module comprising:
an electrically conductive assembly; and
a first reinforcement structure on the inner arrester module.

17. The surge arrester of claim 16, wherein each arrester module further comprises a second reinforcement structure on an exterior of the sidewall.

18. The surge arrester of claim 16, wherein the exterior housing comprises a plurality of segments, and each module is in one of the segments.

19. The surge arrester of claim 16, wherein the surge arrester includes a plurality of arrester modules, and an exhaust region in one of the plurality of modules is oriented in a different direction than an exhaust region in another one of the plurality of modules.

20. The surge arrester of claim 16, wherein, during an over-voltage condition, each of the electrically conductive assemblies conducts fault current, and a flammable material within a pre-determined distance of the surge arrester is not substantially damaged or does not ignite.

21. The surge arrester of claim 19, wherein the pre-determined distance is 7 to 9 feet, and the fault current is between 65 A and 12 kA.

22. The surge arrester of claim 21, wherein the flammable material is directly below the surge arrester.

23. The surge arrester of claim 16, wherein the inner arrester module is separated from an interior surface of the sidewall such that there is an open region between the interior surface of the sidewall and the inner arrester module.

24. An assembly for a fire-mitigating surge arrester, the assembly comprising:
an electrically conductive assembly;
a first reinforcement structure on the electrically conductive assembly; and
a cartridge comprising a first end, a second end, a sidewall that extends between the first end and the second end, and an exhaust region in the sidewall, wherein
the sidewall surrounds the electrically conductive assembly and the first reinforcement structure, and
an open region separates an interior surface of the sidewall from the first reinforcement structure such that the first reinforcement structure does not make contact with the interior surface of the sidewall.

25. The assembly of claim 24, wherein a fire retardant material is in the open region.

26. The assembly of claim 24, wherein the first reinforcement structure provides longitudinal compression to the electrically conductive assembly.

\* \* \* \* \*